April 8, 1958  D. O. RUMER, JR  2,829,581
WINDSHIELD DEFROSTER ATTACHMENT
Filed March 12, 1956
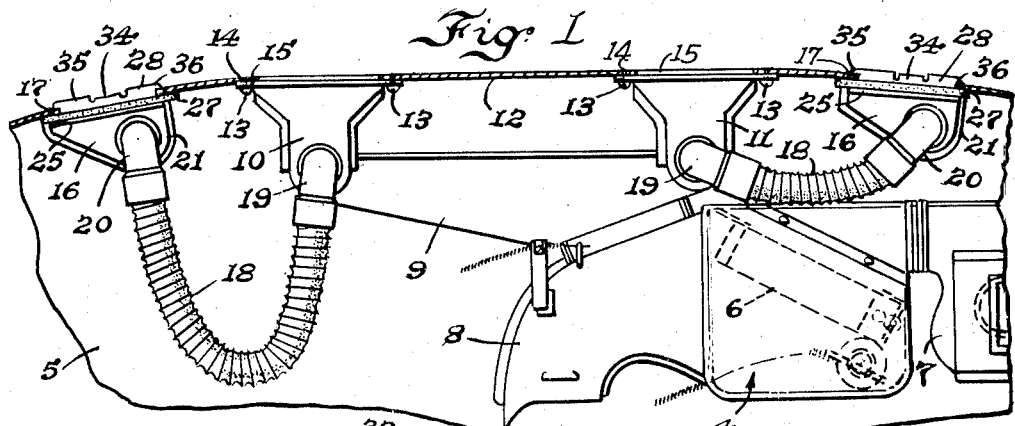
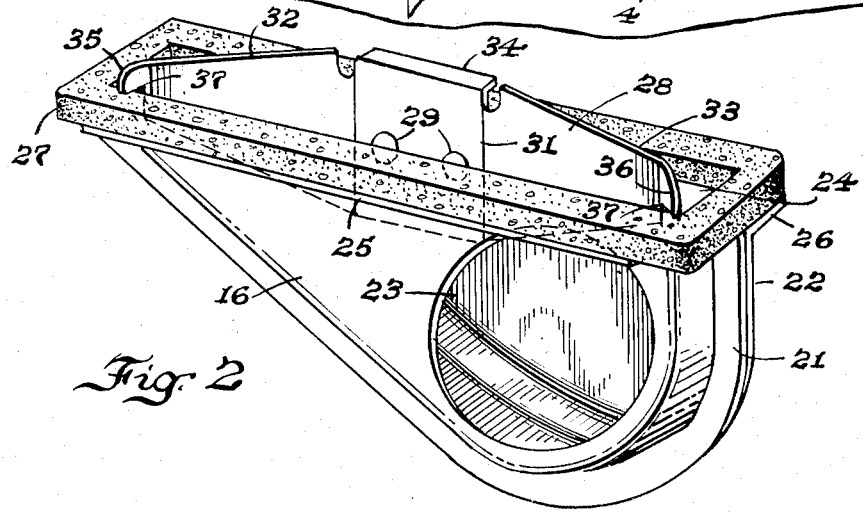
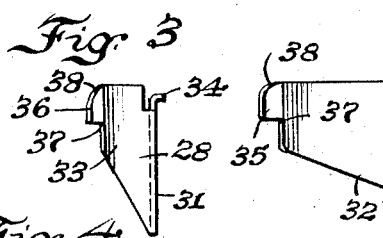
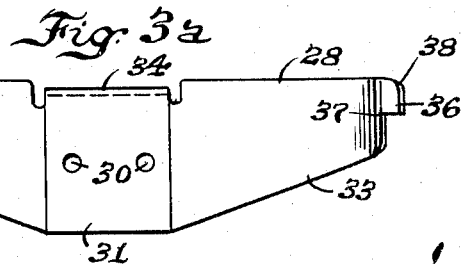
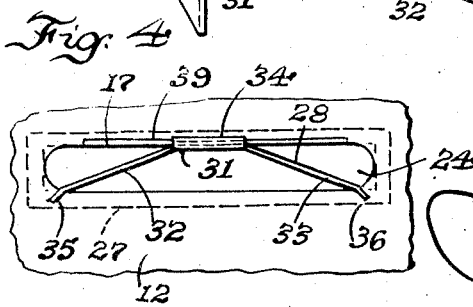
Inventor
David O. Rumer Jr.

US Patent Office
2,829,581
Patented Apr. 8, 1958

2,829,581
WINDSHIELD DEFROSTER ATTACHMENT

David O. Rumer, Jr., Rockford, Ill., assignor to E. L. Schofield, Incorporated, Rockford, Ill., a corporation of Delaware Application March 12, 1956, Serial No. 570,995

8 Claims. (Cl. 98—2)

This invention relates to defroster attachments for automobile windshields, and is more particularly concerned with the provision of one designed to be snapped in place on the dash where one designed to be fastened by means of screws in the old conventional way could not be used conveniently, if at all, because of the small amount of space left for such devices, as is true in the newer cars that have the wrap-around windshields.

A salient feature of the snap-in defroster attachment of my invention is the use of a single generally V-shaped leaf spring clip that is suitably secured at its middle portion to the front wall of the nozzle and has a forwardly bent lug on the upper end of this middle portion to provide one of three widely spaced points of attachment in the slot in the dash next to the windshield, the leaf spring clip also having rearwardly projecting lugs on its opposite ends for engagement in the opposite ends of the slot to complete the three-point connection with the dash, while a soft sponge rubber gasket which overlies the mouth of the nozzle and surrounds the projecting end of the leaf spring clip is compressed between the nozzle and the underside of the dash around the slot to provide an air-tight connection, eliminate rattle, and also maintain the lugs of the leaf spring clip resiliently engaged with the dash. The three-point attachment provided in this manner in a single leaf spring makes for low cost, quick and easy installation, and equalized holding pressure at the three points of connection with the slot in the dash.

The invention is illustrated in the accompanying drawing, in which—

Fig. 1 is a more or less diagrammatic rear view of an automobile heater installation which includes four windshield defrostor nozzles, the two opposite end ones of which are of the snap-in type made in accordance with my invention, the other two being fastened by means of sheet metal screws, as indicated;

Fig. 2 is a perspective view of one of the snap-in nozzles shown on a larger scale;

Figs. 3 and 3a are an end view and rear view, respectively, of the leaf spring clip removed from the nozzle shown in Fig. 2, and Fig. 4 is a top view of a slotted portion of the dash showing how the nozzle of Fig. 2 (shown on a smaller scale) is held when snapped in place.

The same reference numerals are applied to corresponding parts throughout the views.

Referring to the drawing, the reference numeral 4 designates a car heater of the well known type suitably mounted on the upright portion of the dash 5 and utilizing the engine coolant as the heating medium and including a heat exchanging radiator 6 through which the coolant is circulated in the usual way, the heater including a blower 7 with an electric motor driven fan therein which, depending on the setting of controls, draws in fresh air from outside the car and/or re-circulates air from inside the car for passage through the radiator 6 to be heated thereby. The air heated in this way is discharged at 8 into the car and also, if the controls are so set, through the manifold 9 to defrost the windshield. The present invention is concerned with defrosting, so that there is no need for any further description of the heater 4, and it will suffice to state that the defroster manifold 9 has upwardly discharging nozzles 10 and 11 extending directly from the opposite ends thereof and arranged to be fastened to the substantially horizontal portion 12 of the dash 5 next to the windshield by means of sheet metal screws 13 entered in holes 14 adjacent the opposite ends of the elongated defroster slots 15. There is generally no great difficulty in installing the nozzles 10 and 11, because there is usually adequate space in most cars under the dash 12 at the middle and hence these nozzles can be fastened by means of screws 13. However, the newer cars having the so-called wrap-around windshields have very little space left under the ends of the dash 12 and it is necessary, therefore, to provide nozzles 16 designed to be snapped into place in the elongated defroster slots 17 that are provided in the dash 12 at these end portions of the windshield. These nozzles 16, as shown, are supplied with hot air from the center manifold 9 through flexible tubes 18 which have elbows 19 at one end connected to the nozzles 10 and 11, and have elbows 20 on the other end connected to the nozzles 16.

Referring now to Figs. 2 to 4, each of the nozzles 16 is made of two opposed dished sheet metal stampings having marginal vertical flanges 21 and 22 on their abutting edges which are welded or otherwise suitably secured together. A circular inlet opening 23 is provided in one of the two parts of the body of the nozzle 16 to receive the elbow 20, and the top of the nozzle defines an elongated generally rectangular outlet opening 24, of approximately the same size and shape as slot 17, around which there are outwardly projecting flanges 25 and 26 on the two parts of the body in a common horizontal plane for support of a gasket 27 of easily compressible sponge rubber or the like, which is preferably cemented to the flanges 25 and 26 and serves to seal the joint between the nozzle 16 and dash 12 when compressed against the dash in the attaching of the nozzle to the dash in a slot 17. For the snap-in connection of nozzle 16 in slot 17 I provide a single elongated leaf-spring 28 bent lengthwise into a V-shape, as best appears in the plan view Fig. 4, and rivetted at the middle, as at 29, or otherwise suitably secured to one vertical side wall of the nozzle on the inside thereof, the leaf spring having two holes 30 in its flat middle portion 31 to receive the shanks of the two rivets 29 which fasten the leaf spring rigidly in place and prevent pivotal movement of the leaf spring relative to the nozzle, while permitting free flexing of the two arms of the V defined by the opposite end portions 32 and 33 of the leaf spring. The leaf spring 28 is disposed vertically in the nozzle and protrudes from the open upper end 24 thereof, as clearly appears in Fig. 2, for engagement in and connection with the slot 17, as indicated in Figs. 1 and 4. For three point connection, a horizontal lug 34 is bent forwardly from the upper edge of the middle portion 31 of the leaf spring to provide one of the three points of connection, and rearwardly bent lugs 35 and 36 are provided on the upper edge of the two end portions 32 and 33 at their extremities for the other two points of connection, the lug 34 being arranged to overhang the dash at the middle portion of the slot 17 on its one side while the lugs 35 and 36 overhang the dash at the opposite ends of the slot on the other side. The lugs 35 and 36 are defined by notching the extremities of the end portions 32 and 33 of the leaf spring, as indicated at 37 under the lugs.

In attaching each of the nozzles 16 to the dash 12, the nozzle with the elbow 20 attached is thrust upwardly into the small space under the dash 12 at the wrap-around end of the windshield, the rounded upper corners 38 on the lugs 35 and 36 facilitating their riding up into the opposite ends of the slot 17 first for a partial hold, after which the nozzle 16 is forced bodily rearwardly to flex the end portions 32 and 33 of the leaf spring 28 enough to provide clearance for the lug 34 to pass upwardly through the slot 17 behind an upturned flange 39 defining the front of the slot 17. Then the nozzle is rocked about the lugs 35 and 36 as a fulcrum to engage the lug 34 with the back of this flange and slide it up over the edge thereof. When the lug 34 snaps into place the workman knows he has completed the connection. It is clear, therefore, that the leaf spring 28 has to be compressed in order to enter the slot, and hence the front and back of the spring adjacent lugs 34—36 are resiliently engaged with the front and back of the slot 17 so there will never be any tendency for rattle. The three-point connection afforded by the lugs 34, 35 and 36 plus the fact that all three lugs are provided in a single leaf spring, assures equalized pressure at the three points of connection. The gasket 27 in the attaching operation is compressed against the bottom of the dash 12 around the slot 17 enough to provide an air-tight joint between the nozzle and dash and further reduce any likelihood of rattle when the car is in motion. This compression of the gasket 27 also assures uniform downward pressure of lugs 34—36 on top of the dash and freedom from rattle. The resilience of the compressed sponge rubber gasket 27 causes all three lugs 34—36 to be pressed downwardly resiliently and eliminates likelihood of the nozzle working loose and becoming disconnected from the dash. The workman installing these nozzles can tell by the snap engagement of lugs 35 and 36 when the partial hold is obtained and he can tell also by the snap engagement of lug 34 over flange 39 when the final connection is completed. Attaching the nozzles in this way takes a fraction of the amount of time required where nozzles are fastened with screws, and, as stated before, with the small space left at the ends of the dash under the wrap-around ends of the windshield any other type of nozzle than the snap-in type is not practical, because of the great difficulty, if not impossibility, of entering screws and threading them home.

It is believed the foregoing description conveys a good understanding of the objects and advantages of my invention. The appended claims have been drawn to cover all legitimate modifications and adaptations.

I claim:

1. A defroster attachment for application to the underface of a dash in register with an opening through the latter, said attachment comprising a nozzle element having an open outlet end disposed below said dash in register with the opening therethrough, and an elongated leaf spring clip that is bent transversely of its long dimension to generally V-form whereby to define a flat middle portion and opposed diverging end portions, said clip being rigidly secured by its flat middle portion to the inside of said nozzle so that the upper ends of the middle and end portions protrude from the open end thereof for reception in the dash opening, said middle portion having an outward projection on its upper portion and said end portions having outward projections on their upper extremities for spring pressed holding engagement on opposite sides of the dash opening in spaced relationship to one another.

2. A defroster attachment as set forth in claim 1 including compressible resilient gasket means on the open outlet end of the nozzle compressed between said dash and said nozzle in the connection of said spring clip projections in the dash opening, whereby to seal the joint between the nozzle and dash, maintain the projections resiliently under downward pressure on the dash, and eliminate rattle.

3. In a quickly attachable snap-in type connection, an apertured element, a hollow element having an open side in register with the aperture, and a single elongated leaf spring clip bent transversely of its long dimension generally to V-form and rigidly secured at its mid-portion to the hollow element on its inside and protruding from the open side so that the outer edge portion of the mid-portion of the clip is disposed on one side of the aperture and the outer edge portions of the extremities of the opposed end portions of the clip are disposed on the opposite side of the aperture, the clip requiring flexure of the diverging end portions toward the plane of the mid-portion to enter the aperture, whereby said clip is adapted to grip the apertured element resiliently, and said clip having lateral projections on the mid-portion and on the extremities of the end portions for connection with the apertured element.

4. In a quickly attachable snap-in type connection, an apertured element, a hollow element having an open side in register with the aperture, a single elongated leaf spring clip bent transversely of its long dimension generally to V-form and rigidly secured at its mid-portion to the hollow element on its inside and protruding from the open side so that the outer edge portion of the mid-portion of the clip is disposed on one side of the aperture and the outer edge portions of the extremities of the opposed end portions of the clip are disposed on the opposite side of the aperture, the clip requiring flexure of the diverging end portions toward the plane of the mid-portion to enter the aperture, whereby said clip is adapted to grip the apertured element resiliently, and said clip having lateral projections on the mid-portion and on the extremities of the end portions for connection with the apertured element, and a compressible resilient cushioning element compressed between the hollow element and the apertured element in the completion of the snap-in connection of the elements.

5. As an article of manufacture, an elongated leaf spring clip comprising an elongated body bent transversely of its long dimension generally to V-form, whereby to provide a flat middle portion in a substantially vertical plane and diverging end portions in diverging vertical planes, the middle portion having a lug bent horizontally from its upper edge portion away from the diverging end portions, and the latter having lugs bent in the opposite direction relative to the first mentioned lug at their extremities on their upper edge portions, the bottom surfaces of the last named lugs being in a common horizontal plane and substantially parallel to the bottom surface of the first mentioned lug.

6. An article of manufacture as set forth in claim 5, wherein the last named lugs are in vertical planes and defined by notches provided in the extremities of the end portions of the clip below said lugs.

7. A defroster attachment for application to the under-face of a dash in register with an opening through the latter, said attachment comprising a nozzle element having an open outlet end disposed below said dash in register with the opening therethrough, means projecting laterally relative to one side of the open outlet end of said nozzle element for holding engagement on the dash on one side of the opening therein, and an elongated leaf spring clip that is bent transversely of its long dimension to generally V-form whereby to define a middle portion and opposed diverging end portions, said clip being rigidly secured by its middle portion to the inside of said nozzle on the same side with and adjacent the aforesaid means so that the upper ends of the end portions of said clip protrude from the open end of said nozzle on the other side thereof for reception in the dash opening, said end portions having lateral projections on their upper extremities for spring-pressed holding engagement on the dash alongside said opening therein in spaced relationship to one another and to said means for three-point support of the nozzle on the dash.

8. A defroster attachment as set forth in claim 7, including compressible resilient gasket means on the open outlet end of the nozzle compressed between said dash and said nozzle in the connection of said spring clip projections in the dash opening, whereby to seal the joint between the nozzle and dash, maintain the projections resiliently under downward pressure on the dash, and eliminate rattle.

References Cited in the file of this patent

UNITED STATES PATENTS

| | | |
|---|---|---|
| 2,124,798 | Schuler | July 26, 1938 |
| 2,192,657 | Werther | Mar. 5, 1940 |